(12) United States Patent
Draxelmayr

(10) Patent No.: US 6,636,033 B2
(45) Date of Patent: Oct. 21, 2003

(54) SENSOR APPARATUS AND METHOD FOR GENERATING AN OUTPUT SIGNAL OF A SENSOR APPARATUS

(75) Inventor: Dieter Draxelmayr, Villach (AT)

(73) Assignee: Infineon Technologies AG, Munich (DE)

( * ) Notice: Subject to any disclaimer, the term of this patent is extended or adjusted under 35 U.S.C. 154(b) by 0 days.

(21) Appl. No.: 10/205,782

(22) Filed: Jul. 26, 2002

(65) Prior Publication Data

US 2003/0038623 A1 Feb. 27, 2003

Related U.S. Application Data

(63) Continuation of application No. PCT/EP01/00296, filed on Jan. 11, 2001.

(51) Int. Cl.[7] .............................. G01P 3/48; G01D 18/00
(52) U.S. Cl. ................... 324/166; 324/207.12; 324/225
(58) Field of Search ................................. 324/166, 173, 324/225, 174, 207.12, 207.25

(56) References Cited

U.S. PATENT DOCUMENTS

| | | | | |
|---|---|---|---|---|
| 4,374,333 A | * | 2/1983 | Avery ........................... | 327/77 |
| 4,665,318 A | | 5/1987 | Toda et al. | |
| 5,442,283 A | * | 8/1995 | Vig et al. ................. | 324/207.2 |
| 5,497,084 A | * | 3/1996 | Bicking .................. | 324/207.25 |
| 5,694,038 A | | 12/1997 | Moody et al. | |
| 5,777,465 A | * | 7/1998 | Walter ........................ | 324/166 |
| 6,191,576 B1 | * | 2/2001 | Ricks et al. ............. | 324/207.2 |

FOREIGN PATENT DOCUMENTS

| | | |
|---|---|---|
| DE | 691 19 526 T2 | 5/1996 |
| DE | 197 01 260 A1 | 7/1997 |
| DE | 197 01 261 A1 | 7/1997 |
| DE | 197 01 262 A1 | 7/1997 |
| DE | 694 06 973 T2 | 11/1997 |
| DE | 197 07 263 A1 | 8/1998 |
| EP | 0 642 029 A1 | 3/1995 |
| EP | 0 642 029 B1 | 8/2000 |
| WO | WO 99/42789 A1 | 8/1999 |
| WO | WO 01/57478 A1 | 8/2001 |

OTHER PUBLICATIONS

Stumpe et al.,"A New Generation of Adaptie hall–effect based gear tooth sensors: Advantages of merged bimos technology and new packaging concepts", (1996).

* cited by examiner

*Primary Examiner*—N. Le
*Assistant Examiner*—Reena Aurora
(74) *Attorney, Agent, or Firm*—Jenkins, Wilson & Taylor, P.A.

(57) ABSTRACT

A sensor apparatus having a sensor for generating an analog sensor signal with successive minima and maxima is provided. The apparatus can include a first output signal generating device for generating a first alternating output signal in accordance with the zero crossings of the sensor signal; a sequence controller for defining a normal operating phase, in which the first output signal can be output, and a calibration phase, in which a second alternating output signal can be output; and an extremum defining device for the phase-shifted definition of the successive minima and maxima; the sequence controller furthermore having a zero crossing establishing device for establishing fictitious zero crossings of the sensor signal which follow the respective extrema defined by the extremum defining device.

11 Claims, 2 Drawing Sheets

SENSOR APPARATUS AND METHOD FOR GENERATING AN OUTPUT SIGNAL OF A SENSOR APPARATUS

RELATED APPLICATIONS

This application is a continuation of PCT patent application number PCT/EP01/00296, filed Jan. 11, 2001, which claims priority to German patent application number 10004080.2, filed Jan. 31, 2000, the disclosures of each of which are incorporated herein by reference in their entirety.

TECHNICAL FIELD

The present invention relates to a sensor apparatus and a corresponding method for generating an output signal of a sensor apparatus.

BACKGROUND ART

WO 99/42789 discloses an apparatus for detecting a passage between a point on a body and a reference position. The apparatus comprises a pair of magnetic field sensors, each of the sensors generating an output signal based on the size of the magnetic field which passes through the sensor. A difference-forming circuit is provided which receives the output signals of the sensors and generates a difference signal with a peak value when the point of the body is positioned between the pair of sensors. Furthermore, a peak value detector is provided which detects the peak value in the difference signal. Moreover, the apparatus comprises a threshold value circuit which receives the difference signal, for the purpose of generating a gate signal if the magnitude of the difference signal exceeds a threshold level, the gate signal enabling the peak value pulse to be forwarded to an output terminal of the apparatus, and preventing peak value pulses from being forwarded to the output terminal of the apparatus in the absence of the gate signal. Finally, the apparatus comprises a threshold value setting circuit for setting the threshold value in accordance with the magnitude of the difference signal.

DE 197 01 262 A1 discloses a detector for passing magnetic articles with automatic gain control.

EP 0 642 029 A1 and EP 0 642 029 B1 disclose a rise-activated Hall voltage sensor. This sensor comprises a circuit branching device which is arranged in such a way that it follows a positive rise, the subsequent positive peak value of the Hall voltage is held at the detector output and the Hall voltage is applied to a comparator, so that, if, after incipient impinging [sic] of the Hall voltage from the positive maximum value, the increasing difference between the Hall voltage and the held voltage exceeds a predetermined magnitude, the resulting comparator output pulse indicates the beginning of a variation in the strength of the surrounding magnetic field at the Hall element.

Although applicable, in principle, to a wide variety of sensor apparatuses, the present invention and the problem area on which it is based are described with reference to a motor vehicle crankshaft sensor.

As is known, sensors are used to detect the movement or the positional state of rotating parts. Examples thereof are crankshaft, cam shaft, transmission and ABS sensors in motor vehicles. The sensors used are preferably Hall sensors which sense the variations in a magnetic field. For this purpose, by way of example, a permanent magnet is fitted to a stationary part in order to generate a magnetic field. This magnetic field is then modulated, depending on position, by a gearwheel fixed to the rotating part or by another ferromagnetic transmitter. In this case, the Hall sensor is preferably situated between the permanent magnet and the gearwheel or transmitter and can thus detect fluctuations in the magnetic field. By way of example, if a tooth of the gearwheel lies in the magnetic field, then a "high" output signal is supplied, while a gap between the teeth brings about a "low" output signal. In this way, the instantaneous position or annular velocity of a rotating part can be inferred from the signal output by the Hall sensor.

The signal supplied by such a sensor is significantly influenced by the operating conditions under which the sensor is used. These operating conditions include unavoidable imponderables such as, for example, operating temperature or size of the air gap, etc. Despite the fluctuations caused by the operating conditions, the sensor should supply an output signal that is defined as well as possible. In other words, the output signal should have a well-defined profile independently of the fluctuations caused by the operating conditions. The reason for this is as follows: if a sensor apparatus supplies a sinusoidal signal, for example, then a well-defined behavior of a system disturbed by the sensor apparatus can be obtained when switching operations in the system which depend on the output signal of the sensor are performed at the zero crossings of the signal. This is because these zero crossings are independent of the respective signal amplitude and, moreover, have a large edge steepness.

It goes without saying that a switching point other than zero crossing or signal center may possibly also be advantageous in the case of other signal waveforms of the output signal of the sensor.

During the evaluation of the output signal of a sensor for switching a system controlled by said sensor, a switching point should thus be complied with independently of the signal amplitude of the output signal of the sensor, which applies even to those low signals. In detail, VDI Reports 1287, 1996, pages 583 to 611, "A new generation of Hall-effect gearwheel sensors: advantages through the combination of BIMOS technology and new packaging formulations", describes a sensor arrangement in which firstly the amplitude of the output signal of a sensor is normalized if appropriate with the aid of an analog-to-digital converter. The signal peak values are detected with the aid of two further analog-to-digital converters and with digital-to-analog converters. A switching threshold is derived and defined from said peak values. In this way, finally, it is possible to achieve a system behavior that is essentially independent of temperature fluctuations and the width of the air gap. The outlay required for this sensor arrangement is relatively high, however, since gain matching and numerous analog-to-digital converters are required.

A circuit arrangement for calibrating switching points of a decision unit driven by an analog input signal, independently of a DC component contained in the input signal besides an AC component, is known, the input signal having upper and lower signal peaks which are in a selectable fixed ratio to one another. Provision is made, in particular, of peak detectors for determining the upper and lower signal peaks of the input signal; a controllable reference unit for providing a reference signal; a computation unit for determining the average value; a comparison unit; a regulating unit for compensating for the DC component of the input signal and a second regulating unit for oppositely tracking the reference value, said second regulating unit being connected downstream of the comparison unit on the input side and being connected to the reference unit on the output side.

In particular, the output of the sensor apparatus is blocked during the calibration phase. In the case of sensor apparatuses for movement and position identification, however, it is often important to correctly identify even small movements or the beginning of a movement. In the case of sensors which do not operate in a static manner, but rather operate by means of filtering or self-calibration in order to obtain a higher accuracy, the problem can arise, therefore, that, during the transient recovery times, the system operates either only inaccurately or, alternatively, not at all, so that the initial information is lost. A known sensor apparatus needs, for example, a time of six zero crossings until it supplies correct output information after the conclusion of the calibration phase. The time through to that point is required in order to set the internal circuit parameters in such a way that the circuit has suitable operating points.

Static sensors without adaptation do not have this problem. By the same token, they usually also have reduced sensitivity, which restricts the range of use. Sensors with a filter can react to the first or second zero crossing, but usually require a relatively long time before the parameters have adapted to the current operation to an extent such that the specified accuracy is also achieved.

SUMMARY OF THE INVENTION

Therefore, it is an object of the present invention to provide a sensor apparatus and a method for generating an output signal of a sensor apparatus in which relatively reliable output information can also be obtained during the calibration phase.

The sensor apparatus according to the invention has the advantage over the known solution approaches that there is no system dead time during the calibration phase.

The idea on which the present invention is based consists in the fact that, during the calibration phase, that is to say while e.g. the circuit searches for minima and maxima for defining the offset, the output information is not fundamentally blocked or ignored, rather precisely these minima and maxima are utilized as additional information sources.

More precisely, it is assumed that minima and maxima are sought in a signal profile of such a sensor apparatus, while the desire is to output an item of switching information at the signal zero crossings, for example a switching to H for minima and a switching to L for maxima. If a maximum has been found, then it can be assumed that a negative zero crossing will now soon occur, while in the event of a minimum being identified, it can be assumed that a positive zero crossing will soon occur. The temporal offset between the identification of the extrema and the actual zero crossings is by its nature unknown in this case, but it is possible in this way to generate a signal which indicates exactly the same number of zero crossings as are actually contained in the original signal.

Thus, the sensor apparatus based on this principle does not operate particularly accurately with regard to phase angle, since a maximum or a minimum is identified as such only if the actual signal already deviates again considerably from the maximum value or the minimum value. However, neither an item of information too many nor an item of information too few is generated with regard to the fictitious zero crossing, and therefore a distance covered per unit time is reproduced correctly, namely by the time interval between two adjacent fictitious zero crossings that are determined in this way.

In accordance with one preferred development, the zero crossing establishing device is configured in such a way that it establishes a fictitious zero crossing when the magnitude of the amplitude of the sensor signal has fallen by a predetermined proportion after an extremum defined in a phase-shifted manner.

In accordance with a further preferred development, the extremum defining device determines the minima of the analog sensor signal as follows: successive storage of a respective smallest value of the analog sensor signal until the difference in magnitude between a present larger signal value and the smallest signal value stored last is greater than a predetermined threshold. If the difference in magnitude between a present larger signal value and the smallest signal value stored last is greater than a predetermined threshold, definition of the smallest signal value stored last as minimum.

In accordance with a further preferred development, the extremum defining device determines the maxima of the analog signal as follows: successive storage of a respective largest value of the analog sensor signal until the difference in magnitude between a present smaller signal value and the largest signal value stored last is greater than a predetermined threshold. If the difference in magnitude between a present smaller signal value and the largest signal value stored last is greater than the predetermined threshold, definition of the largest signal value stored last as maximum.

In accordance with a further preferred development, the second output signal generating device is configured in such a way that it determines a rotational speed from the fictitious zero crossings established.

In accordance with a further preferred development, the analog sensor signal has an AC voltage component and a DC voltage component. The first output signal generating device has a calibration device for determining the DC voltage component of the analog sensor signal from the difference between successive minima and maxima during the calibration phase.

In accordance with a further preferred development, the first output signal generating device has a subtraction device for subtracting the DC voltage component determined from the analog sensor signal for the purpose of forming a corrected analog sensor signal; and a comparator device for comparing the corrected analog sensor signal with a reference signal and supplying a corresponding first output signal.

An exemplary embodiment of the present invention is illustrated in the drawings and explained in more detail in the description below.

DETAILED DESCRIPTION OF THE INVENTION

Figure 1:
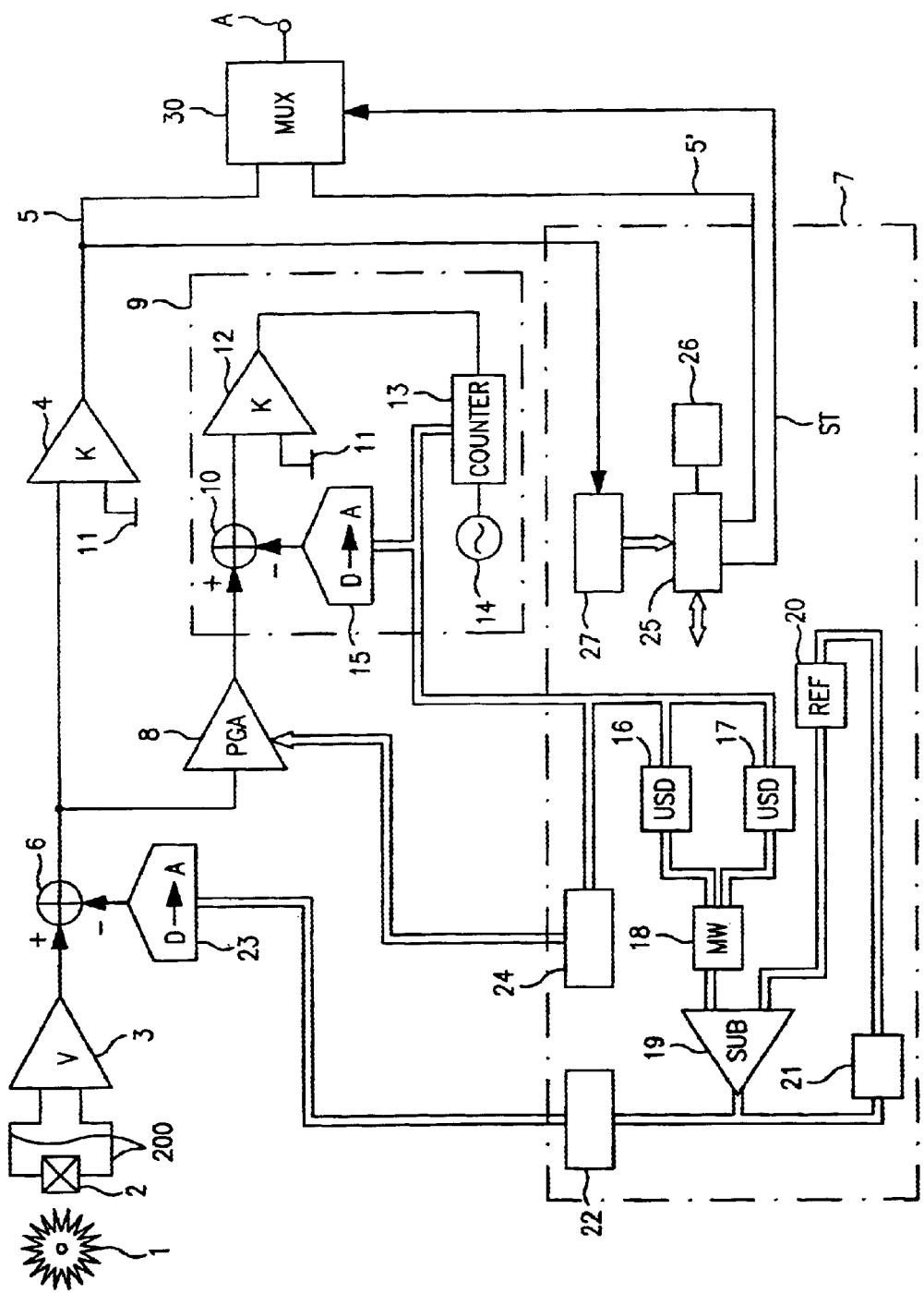
FIG. 1 shows an illustration of a sensor apparatus for elucidating an embodiment of the method according to the invention.

In the sensor apparatus illustrated in FIG. 1, the rotational speed of a gearwheel 1 is detected by means of a Hall sensor, subsequently amplified by means of an amplifier 3 and then converted, with the aid of a comparator 4, into a pulse train whose frequency corresponds to the rotational speed of the gearwheel 1. The pulse train can then be tapped off at an output of the comparator 4 as first output signal 5. By way of example by means of [sic] magnetic DC fields acting on the Hall sensor 2 and/or offset voltages in the amplifier 3 can lead to a DC signal being superposed on an AC signal caused by the movement of the gearwheel in the Hall sensor 2, which leads to the switching points of the comparator 4 being shifted and, consequently, the pulse train of the output signal 5 attaining a different duty ratio. However, this corrupts the relationship between the pulse train of the output signal 5 and the movement of the gearwheel 1.

In order to avoid this, in a known manner, a correction signal determined in a particular manner is subtractively combined with the output signal of the amplifier 3 in the comparator 4 acting as decision unit. This can also be achieved, moreover, for example by correspondingly altering the switching threshold of the comparator 4.

The correction signal is generated by means of a digital control device 7, to which the output signal of the subtractor 6 is fed with the interposition of a digitally controlled analog amplifier 8 and an analog-to-digital converter 9. The analog-to-digital converter 9 operates according to the tracking principle. For this purpose, it has a subtractor 10, one input of which is connected to the output of the amplifier 8. The output of the subtractor 10 is connected to an input of a comparator 12, the other input of which is connected to the reference-ground potential 11. The output of the comparator 12 is connected to the control input of a counter 13, as a result of which the counting direction of the counter is controlled. The counter 13 is additionally connected up to a clock source 14. The counting result can be tapped off at an output of the counter 13 and is fed at [sic] binary word to a digital-to-analog converter 15, which generates a corresponding analog signal from it. This analog signal is passed to the subtractor 10, where it is subtracted from the output signal of the controllable amplifier 8. Overall, the subtractor 10, the comparator 12, the counter 13, the clock generator 14 and the digital-to-analog converter 15 form an analog-to-digital converter 9 which operates according to the tracking principle. This means that the binary word at the output of the counter 13 always follows the output signal of the amplifier 8 in which [sic] the comparator 12, depending on whether the analog signal produced from the binary word at the output of the counter 13 through the digital-to-analog converter is greater or less than the signal at the output of the amplifier 8, changes the counting direction of the counter 13 and thus tracks the binary word to the signal at the output of the amplifier.

The binary word at the output of the counter 13 is additionally fed to two peak value detectors 16, 17, of which one 16 determines the relative minima and the other 17 determines the relative maxima. The lower and upper signal peaks determined by way of the relative minima and maximum are forwarded to a computation unit 18 for calculation of the average value, which determines the zero position of the input signal therefrom by averaging, for example. This zero position is compared with a reference value by means of a subtractor 19, which is connected downstream of the computation unit 18. The reference value is provided by a reference unit 20, which is likewise connected to the subtractor 19. In this case, the reference value is altered by a reference control unit 21, which is connected upstream of the reference unit 20 and downstream of the subtractor 19, in dependence in such a way that the reference value is altered when the magnitude of the value of the computation unit for the average value lies outside a specific predetermined range.

The output of the subtractor 19 is additionally led to a regulating unit 22, which, depending on the output signal at the subtractor 19, generates a drive signal for the digital-to-analog converter 23 connected downstream of it. In this case, the regulating unit 22 generates a digital correction value which is converted into an analog correction signal by the digital-to-analog converter 23. Said correction signal is then subtracted from the output signal of the amplifier 3 by means of the subtractor 6.

The control device 7 additionally receives a drive unit 24, which is connected to the control input of the controllable amplifier 8 on the output side and to the output of the counter 13 on the input side. The drive unit 24 may, for example, contain a shift register whose content is formed by the binary word at the output of the counter 13 and is controlled by it, thus resulting overall in logarithmization of the binary word at the output of the counter 13.

All the functions of the control device 7 are controlled by a sequence controller 25. The sequence controller 25 is for the [sic] connected to a timer 26 and a monitoring device 27 and to various other components (indicated as double arrow in FIG. 1 for simplification). On the input side, the monitoring device 27 is connected to the output of the comparator 4 in order to monitor the output 5 to the effect of whether it a signal change [sic] has taken place within a specific time period prescribed by the timer 26. If no alteration is ascertained for this period of time, then a new measurement of the DC component in the output signal of the amplifier is carried out.

On the output side, the sequence controller supplies a second output signal 5' and a control signal ST. The first and second output signals 5, 5' are passed to a multiplexer or changeover switch 30, which can be switched by the control signal ST in such a way that it supplies as output signal A the second output signal 5' during the calibration phase and the first output signal 5 during normal operation, that is to say in the calibrated state.

In order to generate the second output signal 5', the sequence controller 25 contains an extremum defining device for the phase-shifted definition of the successive minima and maxima on the basis of the information of the peak value detectors 16, 17, and also a zero crossing establishing device for establishing fictitious zero crossings of the sensor signal 200 which follow the respective extrema defined by the extremum defining device.

Furthermore, provision is made of a second output signal generating device for generating the second alternating output signal 5' in accordance with the fictitious zero crossings of the sensor signal 200.

Figure 2:
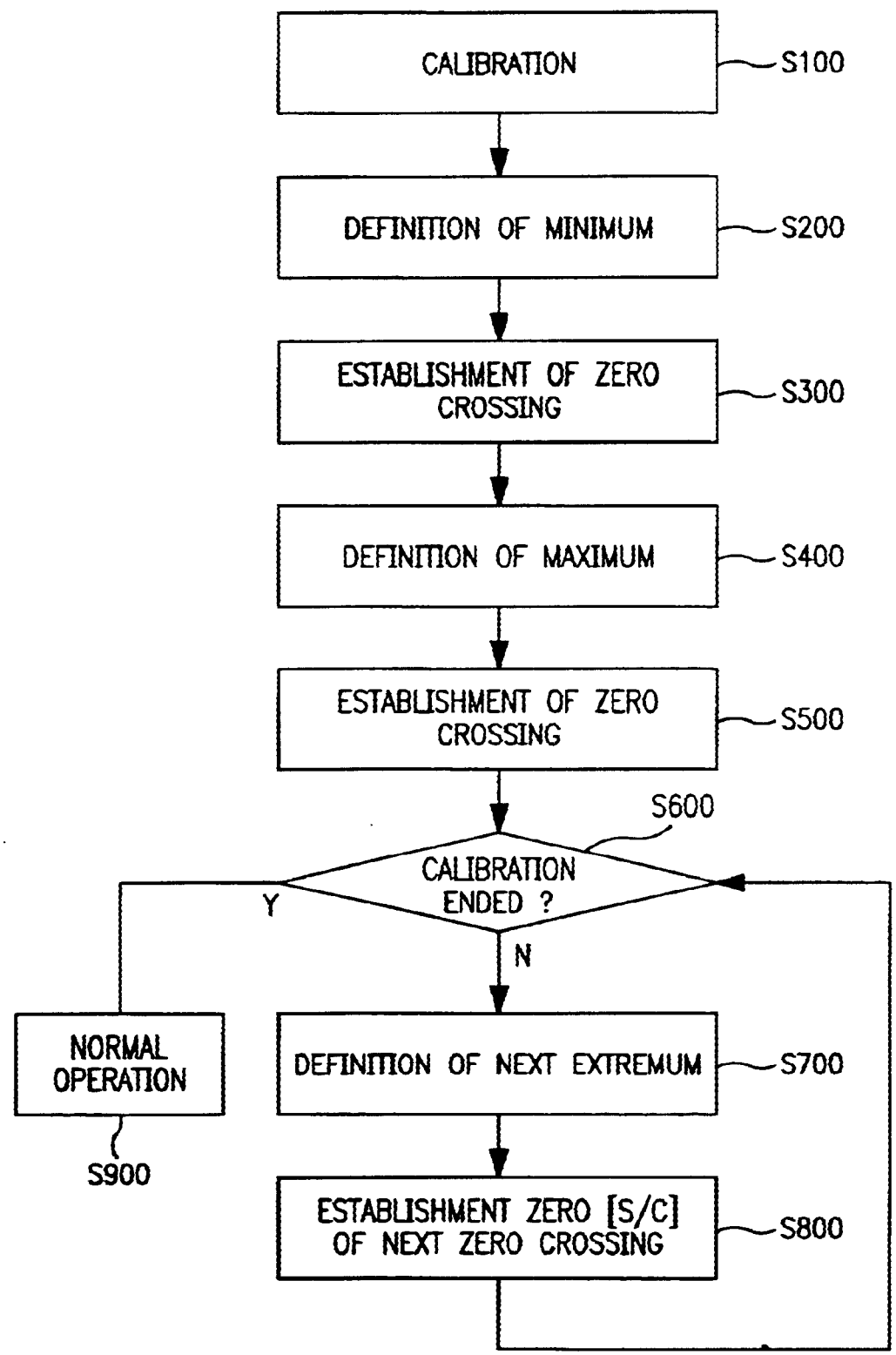
FIG. 2 shows a flow diagram of the embodiment of the method according to the invention.

FIG. 2 shows a flow diagram of the embodiment of the method according to the invention.

As stated, the second output signal 5' is present at the system output A of the multiplexer 30, under the control of the control signal ST, for as long as the calibration proceeds (step 100).

During the calibration, the digital signal values detected by the control device 7 are examined for minima and maxima. In this case, extrema are accepted as such only when they are sufficiently greatly pronounced, i.e. a maximum is accepted as such only when the signal subsequently becomes significantly smaller again. The same applies correspondingly to minima. This condition affords protection against a signal being simulated by noise or other system disturbances. In particular, during the identification of minima, a memory stores the smallest value found hitherto. If the present value is greater than this value plus a safety margin (noise margin), the stored value is interpreted as minimum (step 200).

In this example, the zero crossing establishing device is configured in such a way that it establishes a fictitious zero crossing when the magnitude of the amplitude of the sensor signal 200 has fallen by a predetermined proportion, e.g. in this case by 30%, after such an extremum (minimum in this case) defined in a phase-shifted manner (step 300).

At the same time, the old maximum is erased and a new maximum search is started. The maximum search functions analogously. The largest value found hitherto is stored, and if the present value has fallen to a sufficient extent, (safety margin), the stored value is interpreted as maximum (step 400).

Once again the zero crossing establishing device establishes a fictitious zero crossing when the magnitude of the amplitude of the sensor signal 200 has fallen by a predetermined proportion, e.g. in this case by 30%, after such an extremum (maximum in this case) defined in a phase-shifted manner (step 500).

At the same time, a new minimum search is started.

Thus, during the calibration, zero crossings can be continuously determined between respective adjacent pairs minimum/maximum or maximum/minimum and a rotational speed, for example, can be determined from the time interval between the zero crossings.

This operating mode lasts (step 600-step 800) until the calibration phase is concluded. A changeover is then made to the normal calibrated operating mode (step 900), where the comparator 4 supplies the output signal 5 via the multiplexer 30 at the system output A.

Although the present invention has been described above using a preferred exemplary embodiment, it is not restricted thereto, but rather can be modified in diverse ways.

In particular, the method according to the invention can be used for a wide variety of sensor types.

The extrema determination, too, can, of course, take place in a different manner than that shown.

Furthermore, the fictitious zero crossings can be established by other methods, e.g. time control methods, event control methods, or the like.

What is claimed is:

1. Sensor apparatus having:
   (a) a sensor for generating an analog sensor signal with successive minima and maxima;
   (b) a first output signal generating device for generating a first alternating output signal in accordance with the zero crossings of the sensor signal;
   (c) a sequence controller for defining a normal operating phase, in which the first output signal is output, and a calibration phase, in which a second alternating output signal is output; and
   (d) an extremum defining device for the phase-shifted definition of the successive minima and maxima;
   the sequence controller furthermore having:
   (e) a zero crossing establishing device for establishing fictitious zero crossings of the sensor signal which follow the respective extrema defined by the extremum defining device; and
   (f) a second output signal generating device for generating the second alternating output signal in accordance with the fictitious zero crossings of the sensor signal;
   the first and second output signals being passed to a changeover switch, which is switched by a control signal, generated by the sequence controller, in such a way that it supplies as output signal the second output signal during the calibration phase and the first output signal during normal operation in the calibrated state.

2. Sensor apparatus according to claim 1, wherein the zero crossing establishing device is configured in such a way that it establishes a fictitious zero crossing when the magnitude of the amplitude of the sensor signal has fallen by a predetermined proportion after an extremum defined in a phase-shifted manner.

3. Sensor apparatus according to claim 1, wherein the extremum defining device determines the minima of the analog sensor signal as follows:
   (a) successive storage of a respective smallest value of the analog sensor signal until the difference in magnitude between a present larger signal value and the smallest signal value stored last is greater than a predetermined threshold; and
   (b) if the difference in magnitude between a present larger signal value and the smallest signal value stored last is greater than a predetermined threshold, definition of the smallest signal value stored last as minimum.

4. Sensor apparatus according to claim 1, wherein the extremum defining device determines the maxima of the analog sensor signal as follows:
   (a) successive storage of a respective largest value of the analog sensor signal until the difference in magnitude between a present smaller signal value and the largest signal value stored last is greater than a predetermined threshold; and
   (b) if the difference in magnitude between a present smaller signal value and the largest signal value stored last is greater than the predetermined threshold, definition of the largest signal value stored last as maximum.

5. Sensor apparatus according to claim 1, wherein the second output signal generating device is configured in such a way that it determines a rotational speed from the fictitious zero crossings established.

6. Sensor apparatus according to claim 1, wherein the analog sensor signal having an AC voltage component and a DC voltage component; and the first output signal generating device having a calibration device for determining the DC voltage component of the analog sensor signal from the difference between successive minima and maxima during the calibration phase.

7. Sensor apparatus according to claim 6, the first output signal generating device having a subtraction device for subtracting the DC voltage component determined from the analog sensor signal for the purpose of forming a corrected analog sensor signal; and a comparator device for comparing the corrected analog sensor signal with a reference signal and supplying a corresponding first output signal.

8. Method for generating an output signal of a sensor apparatus having a sensor for generating an analog sensor signal with successive minima and maxima, the method having the following steps:
   (a) definition of a normal operating phase, in which a first alternating output signal is output in accordance with the zero crossings of the sensor signal, and a calibration phase, in which a second alternating output signal is output;
   (b) phase-shifted definition of the successive minima and maxima and establishment of fictitious zero crossings of the sensor signal which follow the respective extrema defined in a phase-shifted manner; and
   (c) generation of the second alternating output signal in accordance with the fictitious zero crossings of the sensor signal;
   (d) the first and second output signals being passed to a changeover switch, which is switched in such a way that it supplies as output signal the second output signal during the calibration phase and the first output signal during normal operation in the calibrated state.

9. Method according to claim 8, wherein a fictitious zero crossing is established when the magnitude of the amplitude of the sensor signal has fallen by a predetermined proportion after an extremum defined in a phase-shifted manner.

10. Method according to claim 8, wherein the minima of the analog sensor signal are determined as follows:

(a) successive storage of a respective smallest value of the analog sensor signal until the difference in magnitude between a present larger signal value and the smallest signal value stored last is greater than a predetermined threshold; and (b) if the difference in magnitude between a present larger signal value and the smallest signal value stored last is greater than a predetermined threshold, definition of the smallest signal value stored last as minimum.

11. Method according to claim 8, wherein the maxima of the analog sensor signal are determined as follows:

(a) successive storage of a respective largest value of the analog sensor until the difference in magnitude between a present smaller signal value and the largest signal value stored last is greater than a predetermined threshold; and (b) if the difference in magnitude between a present smaller signal value and the largest signal value stored last is greater than the predetermined threshold, definition of the largest signal value stored last as maximum.

* * * * *